Patented June 9, 1936

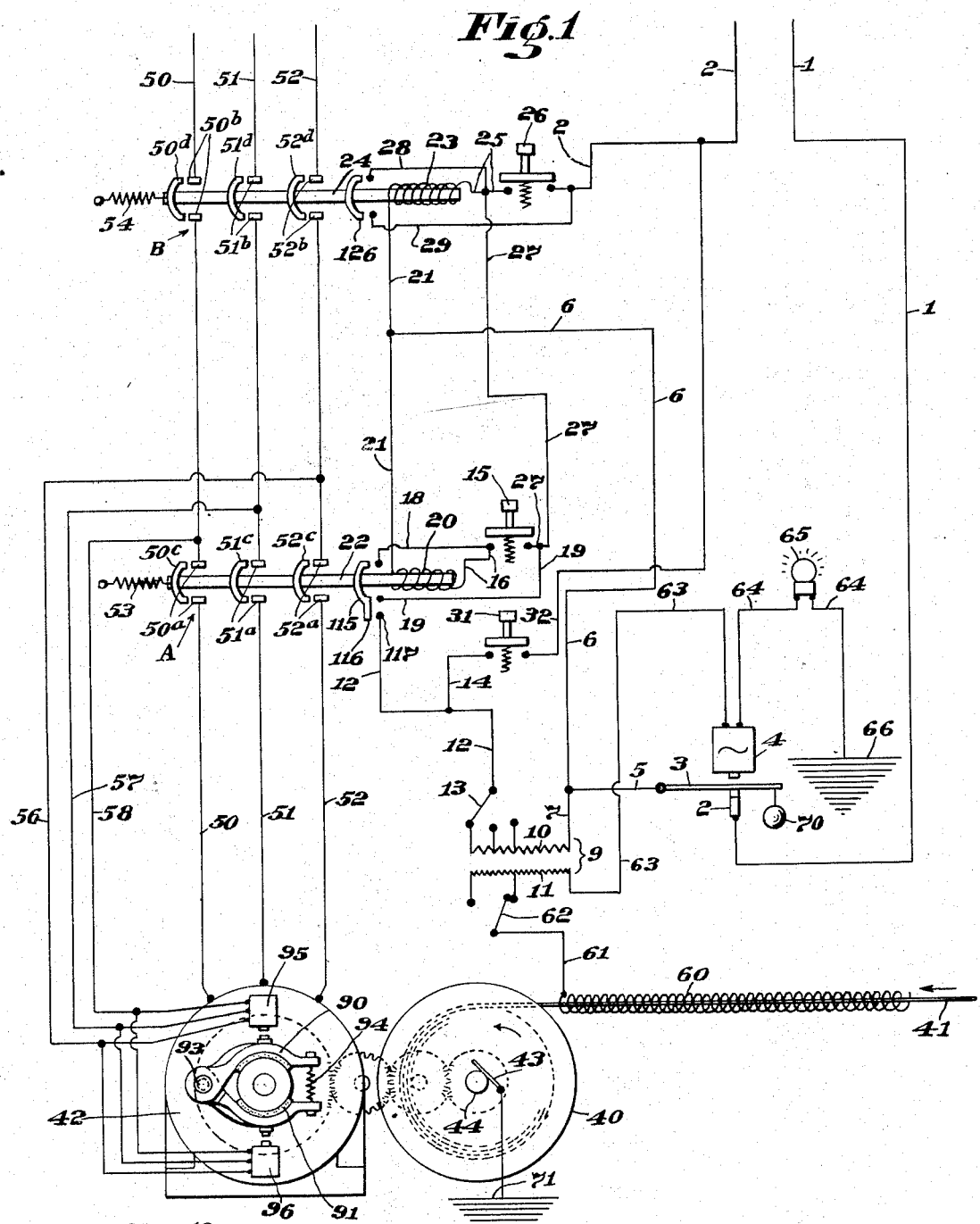

2,043,528

UNITED STATES PATENT OFFICE 2,043,528

WIRE INSULATION TESTING APPARATUS AND METHOD

Ralph L. Davis, Wallingford, Conn.

Application August 4, 1932, Serial No. 627,450

19 Claims. (Cl. 175—183)

This invention relates to apparatus for testing insulation on conductor wires and particularly to a device for use in association with reeling operations of the insulation applying process, to stop the reel upon passage toward it of wire having faulty insulation.

Successful commercial operation of a wire insulation testing device of this nature requires that it be extremely sensitive in its detection of fault and rapid in response thereto. The winding on reels of the wire or cable at the completion of the process of applying the insulation or at any stage in the manufacture should, for efficiency, be effected at a high rate of speed. A device intended to respond to small breaks in insulation of wire passing so rapidly through test must not only be extremely sensitive to be affected by the breaks in insulation but must also respond instantaneously if the reel is to be stopped before the wire with the defective portion has been wound to any considerable extent.

It is the primary object of my invention to provide a device more sensitive and more quickly responsive than prior art devices of this nature.

My device operates on the broad, general principle, known to the prior art, of impressing a difference of potential between the metal core of the insulated wire and another conductor placed in proximity to the wire under test so that upon the occurrence of a break in insulation, a current will pass between the two conductors which will establish a circuit to some electrically responsive indicating means. Comparatively high voltages are usually employed in order to efficiently break down the dielectric gap separating the two conductors and safety to the operator requires that some reliable provision be made against his being subjected to shock.

In the prior art high frequency currents have been resorted to as a safety measure but they have been found undesirable in that they deleteriously affect the insulation. Transformers having a magnetic shunt between the primary and secondary windings whereby to provide a characteristic curve indicating a marked drop in voltage upon application of load have been employed and are desirable in that the high secondary voltages fall off immediately harmful contact is made. The difficulty with using a transformer of this type has been that the low current in the secondary side upon break down has heretofore necessitated (for any degree of practicability) the use of break down indicating devices on the primary side of the transformer wherein comparatively high currents may be utilized, but such systems have been found not to be as quickly and sensitively responsive to break down as desired and as is essential for greatest effectiveness.

I have remedied the disadvantages inherent in prior art devices of this general nature by providing electrically responsive means which are highly sensitive to small currents and are thereby adapted for efficient use on the secondary side of a magnetic shunt transformer and by employing, on the secondary side, a circuit having a relatively small time constant so that current quickly builds up to its normal, though small, value when closed circuit is established. I am thereby enabled to provide a testing apparatus more sensitive and more quickly responsive than those known to the prior art and at the same time not only eliminate high frequency currents, even of the order resulting from the use of a condenser shunted across the sparking gap, but also to employ the magnetic shunt transformer with its attendant advantages of high voltages with physical safety.

It is a further object of my invention to provide novel means for visibly indicating both that the apparatus is "alive" through the impression of high voltage on the testing conductor and also that defective insulation is passing through the testing coil and current has passed to the conductor under test.

These and further objects will appear from a detailed description of my invention taken in connection with the accompanying drawing in which, Fig. 1 is a wiring diagram of the preferred embodiment of my invention, and Fig. 2 is a diagrammatic view of a suitable magnetic shunt transformer.

In the diagram 1 and 2 indicate power mains leading from a suitable source of alternating current at commercial frequency and, if desired, at 110 volts. The main 1 leads to the contactor 8 adapted to electrically contact the armature 3 of a relay 4. The armature 3 is connected by the wire 5 to the wires 6 and 7, the former of which joins the wire 21 and the latter of which leads to the primary 10 of a step-up transformer 9 whose secondary is indicated at 11. The wire 12 leads from the other side of the primary 10 through an electric switch 13 adapted to select various taps leading from the primary 10, as shown, to provide for varying voltages in the secondary 11 in a well known manner.

The aforesaid conductor 21 extends in both directions from its point of junction with the wire 6 and connects, in series, two solenoids 20 and 23, the latter of which joins, through the wire 25, with one terminal of a spring push button switch 26 connected at its other terminal with the second power main 2. The solenoids 20 and 23 slidably receive the elongated cores 22 and 24 respectively. As pointed out more in detail hereinafter depression of the push button switch 26 introduces energizing current to the solenoid 23 through a circuit including the wires 6, 21, 25 and 2 and for certain purposes, which will also appear, I wish to provide that the switch 26, after a momentary depression, may be released and yet, at the same time, circuit be maintained through the solenoid 23. For this purpose I provide a maintaining switch contactor 126 comprising a conductor bar, arcuate in shape, and rigidly secured to the core 24 from which it is electrically insulated. One terminal of this switch 126 is connected through the wire 28 with the wire 25 and the other terminal joins the wire 29 leading to the power main 2. Thus, upon energizing of the solenoid 23 through depression of the switch 26, the core 24 will be attracted causing a closing of contactor 126 across the lines 28 and 29. If now the button switch 26 be released circuit will still be maintained through the solenoid 23 through the wire 21, solenoid 23, wires 25 and 28, switch 126 and wires 29 and 2.

The wire 25 is also connected to a wire 27 leading to one terminal of a second push button switch 15 from the other terminal of which the wire 16 leads to the solenoid 20. Circuit is established through the solenoid 20 upon depression of the switch 15 through the wires 27, 16 and 21, as will appear, and to provide a similar circuit maintaining device for this solenoid its core 22 carries the conductor bar 115 adapted to simultaneously contact the terminals of wires 18 and 19, the former of which joins the wire 16 leading to the solenoid 20 and the latter of which joins the wire 27. I provide the switch 115 with an electrically conducting extension 116 adapted, upon attraction of the core, to contact the terminal 117 of the wire 12 leading through the switch 13 to the primary 10 of the transformer 9. The wire 12 also joins the wire 14 of a shunt circuit including a third push button switch 31 adapted to close a circuit from the wire 14 to a wire 32 joining the power main 2.

40 indicates a reel on which the cable 41 is wound after the completion of the process of applying the insulation, or, if desired, during any of the stages of the manufacturing process. The hub 44 of the reel is contacted by the brush 43 which is grounded at 71 and in operation the leading end of the cable 41 is electrically connected to the hub 44 to provide a closed circuit from the cable through the hub to ground. The reel 40 is driven by the motor 42 by means of suitable gearing, as shown, adapted to rotate the reel and wind the cable in the directions indicated by the arrows and for this purpose the motor is connected with a suitable power supply, which may be three phase as indicated by the conductors 50, 51 and 52. Each one of the aforesaid conductors 50, 51 and 52 is broken at two sections as is indicated generally at A and B and the said conductors are provided with spaced contacting terminals 50a, 51a and 52a respectively, at the A section, and 50b, 51b and 52b at the B section.

At the A section the terminals 50a, 51a and 52a are bridged by the arcuate contactors 50c, 51c and 52c respectively, which, like the aforesaid contactor 115, are rigidly mounted on a suitably supported extension of the core 22 of the solenoid 20 and electrically insulated from each other to provide a switch adapted to simultaneously close the circuits at A in the wires 50, 51 and 52 upon the application of power to the solenoid 20. The core 22 is provided at its extremity opposite to that received by the solenoid 20 with a spring 53 adapted to restore and normally hold the three phase switch at A and the contactor 115 in open position when circuit to the solenoid 20 is interrupted. Similarly at the B section, the core 24 also carries the mutually insulated contactors 50d, 51d and 52d and is provided with the restoring spring 54 to normally hold the B switch and the contactor 126 in open position. The conductors 50, 51 and 52 continue beyond the B section to a suitable power supply.

To effect quick stopping of the reel 40 upon occurrence of faulty insulation and the consequent actuation of the break down responsive devices as hereinafter described, I provide the motor 42 with a suitable mechanical brake, indicated diagrammatically by the opposed brake shoes 90 and 91, mounted on a common pivot 93 and mechanically urged into braking position by the spring 94. To electrically effect release of the brakes thus normally held in engagement with the motor shaft, I provide the magnets 95 and 96 supplied at the proper moment with power through the wires 56, 57 and 58 connected to the wires 50, 51 and 52 respectively, between the A and B magnetic switch sections. It should be understood that the above description of the braking mechanism is intended merely as typifying any arrangement whereby the brakes are mechanically applied and electrically released, there being many suitable systems adapted for this purpose, available and well known to the art.

The cable 41 under test travels, in the direction indicated, to the reel 40 through a suitable testing coil 60 which may take the form of a wire helix or a closed metallic pipe or be of any suitable type well known to the art of wire insulation testing devices. The helix 60 is connected by the wire 61 through the switch 62 to the aforesaid secondary 11 of the transformer, the switch 62 being adapted to select one of a number of taps from the secondary 11 to provide for further variation in voltage in the secondary circuit depending upon the specifications of the cable under test, and particularly the thickness of insulation. The secondary 11 is connected on the side opposite the switch 62, with the wire 63 leading to one terminal of the aforesaid relay 4 whose other terminal connects through the wire 64 with the neon light 65 and thence to ground at 66.

The relay 4 should preferably be sensitive to minute currents to the order of 5 or 10 milliamperes which may be accomplished by constructing the coil of the relay of a large number of turns of relatively fine wire. To render the relay unresponsive to small leakage currents I provide its armature 3 with a weight 70 or equivalent spring adapted to maintain the armature contacting position at 2 as shown unaffected by currents of that nature flowing through the relay coil.

As stated above I desire to construct the transformer 9 so that it provides for a quick drop in voltage upon the application of load in the secondary circuit to thereby insure safety to the operative. This characteristic can be obtained in several ways such as the insertion of a series resistance or inductive reactance in series with either the high or low tension windings 10 or 11, but for highest operating efficiency I prefer to effect a rapid drop in voltage by providing a magnetic leakage shunt in the core on which the primary 10 and secondary 11 are wound.

I have indicated diagrammatically in Fig. 2 a magnetic shunt transformer suitable for my purposes. 100 indicates the core suitably laminated and provided with integral side members 101 and 102 and a centrally disposed cross member 103 joining the ends 104. The primary 10 and secondary 11 are wound, as shown, on the member 103 and either or both of these windings may, if desired, comprise two or more coils connected in series as indicated for the secondary 11. Projecting from the sides 101 and 102 of the core are the magnetic flux shunting members 105, juxtaposed as indicated. Transformers of the magnetic shunt variety and of this general design are well known and further description is not considered essential to an understanding of my invention.

With the device constructed as above described, its operation is as follows:

The cable 41 to be tested is first threaded through the testing coil 60 and its leading end electrically secured, in any suitable manner, to the hub 44 of the reel 40 to effectuate grounding of the conductor core of the cable. The "brake" push button switch 26 is then momentarily closed for the purpose of releasing the brakes normally held applied. In closing this switch a closed circuit is established from the power main 1 through the normally closed armature 3 of the relay 4, through the wires 5, 6 and 21 to the solenoid 23 and thence through the wire 25 and switch 26 to the second power main 2. Energizing of coil 23 results in attraction of the core 24 against the action of spring 54, to cause a closing of the switch at the B section in the wires 50, 51 and 52 leading from the three phase supply, thus delivering power to the wires 56, 57 and 58 leading to the magnets 95 and 96 to energize the same and release the brakes. The switch 26 may be immediately released but, as above indicated, circuit will be maintained through the solenoid 23 as a result of the closing of the brake circuit maintaining switch 126 across the lines 28 and 29 leading respectively to the solenoid 23 and power main 2. Thus the brakes are held in released position.

The motor 42 is now started to wind the cable 41 on the reel 40, by depressing the motor push button switch 15 at which time the following closed circuit will be established:—The brake circuit maintaining switch 126 being closed the power main 2 is connected through lines 29 and 28 with wire 25 and as the wire 27, leading from the motor switch 15, joins the wire 25 the motor switch 15 is in series with the power main 2 through the closed switch 126. Switch 15 being now depressed, circuit is closed through wire 16 and solenoid 20 connected at its other end with the wire 21 which as above described, is in circuit with the main 1 through the wire 6, relay armature 3, etc. Energizing of the coil 20 will cause attraction of the core 22 to close the switch in the A section of the power mains 50, 51 and 52, thus completing the circuit from the power supply to the motor 42 to start the same. Circuit will be maintained through the motor starting solenoid 20 upon release of the motor push button switch 15 through the motor circuit maintaining switch 115 which upon closing joins the lead 27 in circuit with the solenoid 20 through the wires 19, 18 and 16 independently of the switch 15 which may therefore be open.

At this time also contact will be made at terminal 117 by the extension 116 of the contactor 115 which will join the wire 12 leading from the primary 10 of the transformer in circuit with the main 2 through the wires 27 and 19. It will be observed that this circuit is in shunt with the circuit through the solenoid 20 so that the high impedance of the transformer 9 will not affect passage of current through the solenoid 20. The primary 10 of the transformer which has thus been connected through to the main 2 is also now connected at its other side with the main 1 through the wires 7 and 5 and armature 3 of the relay and the resultant energizing of the primary induces current at high voltage in the secondary 11 connected, as above indicated, to one end of the testing coil 60. The secondary 11 being connected on the other side through the wire 63, relay 4, and neon light 65 to ground at 66 and the cable under test being grounded through the hub 44 at 71, there is established a complete secondary circuit broken only by the dielectric separating the testing coil 60 and the conductor core of the cable 41 which dielectric comprises the insulating material on the cable and the air gap between the insulation and the testing coil. Due to the high voltage of this secondary circuit a high electric stress intensity is impressed from the coil through the insulation tending to break down the dielectric gap. Upon the occurrence of faulty insulation on wire in proximity to the coil, the dielectric strength of this gap is so weakened that arcing will occur between the testing coil 60 and the cable 41 thus completing the secondary circuit which will cause the relay to attract its armature 3 and the neon light to flash up, the latter providing visible indication of the occurrence of a break in insulation. Breaking of the contact at 2 through rotation of the armature 3 of the relay interrupts the circuit through the entire system by causing a break at the point where the power lead 1 enters the system. The restoring springs 53 and 54 at the A and B stations act to quickly retract the cores 22 and 24, respectively, thus interrupting the circuit in the three phase power supply to shut off power to the motor 42 and release the brake magnets so that they may be mechanically applied. Retraction of the cores also opens the contacts at the brake and motor circuit maintaining switches 126 and 115 respectively, as well as at the transformer energizing circuit switch 116 to restore the several contactors to their initial open position. The armature 3 will immediately close at 2 upon deenergizing of relay 4 but the various other switches in the device being open the motor will remain stationary with brakes applied.

It is apparent from the above description that I have provided a device which acts quickly in response to the passage in proximity to the testing coil of cable having faulty insulation. Upon break down the small current required to actuate the highly sensitive relay 4 is rapidly built up due to the high ratio of resistance to inductance and the resulting small time constant of the secondary circuit. Another factor which has been found to contribute to the rapidity of breakdown response actuation resides in the provision for breaking the several contacts controlling the motor and brake circuits rather than establishing of response circuits at that time as heretofore.

In operation it will be found that there is a small amount of leakage current passing through the secondary circuit, partly capacity currents through the action of the coil 60 and cable 41 as a condenser, which currents may be of the order of approximately 2 to 5 milliamperes. The relay, although normally sensitive to these currents, has its armature weighted to prevent attraction under their influence.

The neon lamp is of a type available on the market and requires no more than 3 to 4 milliamperes for clearly visible brilliance. As the normal leakage currents before break down are of this magnitude the neon lamp performs the dual function, first of showing a glow when the circuit through the primary 10 of the transformer 9 is established to indicate that high potential is impressed on the testing coil and, second, to indicate the occurrence of break down by flashing up upon the passage of higher arcing currents.

It should be noted that my novel wiring method and particularly the circuits leading to the solenoids 20 and 23 which actuate the switches in the three phase supply at the A and B sections, respectively, precludes inadvertent starting of the motor without first releasing the brakes and also prevents the motor starting without the impression of high voltage on the testing coil 60. If the switch 15 be closed to start the motor with the switch 26 open and thus with the brakes mechanically applied, the circuit through the solenoid 20 is not established due to the fact that it includes the open switch 26 in series through the wires 27 and 25 or the open maintaining switch 126 through the wire 28. To start the motor 42 and to energize the transformer both switches 26 (or the maintaining switch 126) and 15 must thus be closed and in that order with the result that the brake must be off.

It is sometimes desirable, however, to release the brakes on the motor without applying power to start it so that the reel may be manually rotated to search for faulty insulation should its exact location not be determined by the arc as the cable passed through the coil. It will be observed that if the switch 26 be closed, circuit is established through the solenoid 23 by the wiring above described independent of the switch 15 which may therefore be open and the reel rotated by hand. I have included the jog switch 31 for the purpose of providing a momentary high voltage in the testing coil if desired to facilitate location of the insulation break upon manual unwinding of the cable through the reel. Depression of the button 31 completes the circuit from the power main 1 through the armature 3, (now closed), wires 5 and 7, the primary 10, wire 12, wires 14 and 32 completing the circuit to the main 2 independently of the several other switches in the device.

In view of the above description of the preferred embodiment of my novel apparatus it is believed that my novel method has also now been disclosed and that a brief résumé of the steps which it comprises will suffice. As indicated, I provide for the passage in proximity to a testing conductor of the cable or wire under test and upon the occurrence of faulty insulation on the cable, I provide for the passage between the testing conductor and said cable of an electric current of small amperage, comparatively high voltage and at commercial frequencies. This current then passes to electrically responsive indicating means adapted to signify the passage in proximity to the testing conductor of cable having faulty insulation and to simultaneously interrupt relay circuits leading to the motive power for rotating the winding reel to stop the same and apply the brakes. Any suitable form of apparatus may be employed to carry out my novel process, but I have found that the apparatus herein described is best adapted for that purpose.

It will be apparent that my invention, both in its apparatus and method aspects, is subject to various modifications within the spirit of my invention and it is to be understood that I do not wish to be limited except as indicated in the appended claims.

I claim:

1. In a system for testing the insulation resistance of insulation surrounding a conductor core of wire, a testing electrode in operative relation with said wire and spaced from its conductor core only by the insulation, a take-on roll for said wire, means for feeding said conductor core of wire past said electrode to said take-on roll and means connected to said testing electrode and operative while said wire is being moved past said testing electrode for indicating the insulation resistance of successive sections of said insulation.

2. In a system for testing the dielectric strength and insulation resistance of insulation surrounding a conductor core of wire, a take-on roll for said wire, a testing electrode in operative relation with said wire and spaced from its conductor core only by the insulation, means for feeding said conductor core of wire past said electrode to said take-on roll and means connected to said testing electrode and operative while said wire is being moved past said testing electrode for simultaneously indicating the insulation resistance and dielectric strength of said insulation.

3. In a system for testing the dielectric strength and insulation resistance of insulation surrounding a conductor core of wire, a testing electrode in operative relation with said wire and spaced from its conductor core only by the insulation, a take-on roll for said wire, means for feeding said conductor core of wire past said electrode to said take-on roll and low current responsive means connected to said testing device and operative while said wire is being moved past said testing device for indicating the insulation resistance and dielectric strength of said insulation.

4. In a system for testing the insulation resistance of insulation surrounding a conductor core of wire, a testing electrode in operative relation with said wire and spaced from its conductor core only by the insulation, a take-on roll for said wire, means for feeding said conductor core of wire past said electrode to said take-on roll and low voltage, low current responsive means connected to said testing electrode over a circuit having a relatively small time constant so that current builds up quickly to a normal, small value when a closed circuit is established for testing the insulation resistance of said insulation.

5. In a system for testing the dielectric strength and insulation resistance of insulation surrounding a conductor core of wire, a testing electrode in operative relation with said wire and spaced from its conductor core only by the insulation, a take-on roll for said wire, means for feeding said conductor core of wire past said electrode to said take-on roll, low voltage, low current responsive means connected to said testing electrode over a circuit having a relatively small time constant so that current builds up quickly to a normal, small value when a closed circuit is established for indicating the dielectric strength and insulation resistance for said insulation.

6. In a system for testing the dielectric strength and insulation resistance of insulation surrounding a conductor core of wire, a testing electrode in operative relation with said wire and spaced from its conductor core only by the insulation, a take-on roll for said wire, means for feeding said conductor core of wire past said electrode to said take-on roll, and low current responsive means connected to said testing device and operative while said wire is being moved past said testing device for indicating the insulation resistance and dielectric strength of said insulation, said current being of the order of five to ten milliamperes.

7. In a system for testing the dielectric strength of insulation surrounding a conductor core of wire, a source of potential of the value to which the dielectric strength of said conductor is to be measured, a testing electrode in operative relation with said wire and spaced from its conductor core only by the insulation, said testing electrode being connected to said source of power, means for feeding said conductor core of wire past said electrode, electrically responsive means sensitive to small currents connected in circuit with said testing electrode and source of potential on the low voltage side with respect to ground and operated in response to faulty insulation in said wire for stopping said conductor.

8. In a system for testing the dielectric strength of insulation surrounding a conductor core of wire, a testing electrode in operative relation with said wire and spaced from its conductor core only by the insulation, a take-on roll for said wire, means for feeding said conductor core of wire past said electrode to said take-on roll, means for controlling said conductor wire feeding means, a relay connected in series with said testing device and responsive to faulty insulation in said wire; an armature for said relay having a back contact and circuit connections extending from said back contact and including said controlling means, said circuit connections being broken by the opening of said back contact for controlling said conductor wire feeding means.

9. In a system for testing the dielectric strength of insulation surrounding a conductor core of a wire, a source of power; a testing electrode electrically connected to said source of power in operative relation with said wire and spaced from its conductor core only by the insulation, means for feeding said conductor core of wire past said electrode; means for controlling said feeding means; a relay connected in series with said testing electrode and responsive to faulty insulation in said wire; an armature for said relay having a closed back contact; circuit connections extending from said back contact and including said feeding controlling means for controlling said conductor wire feeding means; said circuit connections including said source of power, whereby upon energization of said relay for controlling said feeding means, said source of power is electrically disconnected from said testing electrode.

10. In a system for testing the dielectric strength of insulation surrounding a conductor core of wire, a source of power, a testing electrode electrically connected to said source of power, said electrode being in operative relation with said wire and spaced from its conductor core only by the insulation, means for feeding said conductor core of wire past said electrode, a relay connected in series with said testing electrode and operated in response to faulty insulation in said wire for stopping said conductor and means for normally passing current through said relay of an amount less than the response value of said relay for conditioning it for instantaneous operation in response to a dielectric breakdown current.

11. In a system for testing the dielectric strength and insulation resistance of insulation surrounding a conductor core of wire, a testing electrode in operative relation with said wire and spaced from its conductor core only by the insulation, a take-on roll for said wire, means for feeding said conductor core of wire past said electrode, a relay, an insulation resistance indicating device and circuit connections including said relay, said insulation resistance indicating device and said testing electrode for indicating the insulation resistance and dielectric strength of said wire insulation.

12. In a system for testing the insulation resistance of insulation surrounding a conductor core or wire, a testing electrode in operative relation with said wire and spaced from its conductor core only by the insulation, a means for feeding said conductor core of wire past said electrode a source of power, a relay, having an armature, a transformer having a primary winding connected to a source of power through said armature and a secondary winding connected to said testing electrode, circuit connection including said relay, said secondary and said testing electrode; and means including said armature responsive to an energization of said relay when a failure in said insulation is found by said testing electrode for stopping said conductor core feeding means from feeding said wire and for disconnecting said source of power from said transformer.

13. In a system for testing the insulation resistance of insulation surrounding a conductor core of wire, a testing electrode in operative relation with said wire and spaced from its conductor core by the insulation, a take-on roll for said wire, means for feeding said conductor core of wire past said electrode to said take-on roll, a relay, a transformer having a primary winding connected to a source of power and a secondary winding connected to said testing electrode, said transformer having a high magnetic leakage shunt to produce a considerable voltage drop upon the application of a load and circuit connections including said relay, said secondary and said testing electrode.

14. In a system for testing the insulation resistance of insulation surrounding a conductor core of wire, a testing electrode in operative relation with said wire and spaced from its conductor core by the insulation, a source of power, means for feeding said conductor core of wire past said electrode, a relay, a transformer having a primary winding connected to said source of power and a secondary winding connected to said testing electrode and circuit connections including said relay, for operating said relay from current flowing in said transformer when a fault in said insulation occurs, said transformer circuit having a relatively small time constant so that current builds up quickly to a normal but small value when a closed circuit is established.

15. In a system for testing the insulation resistance of insulation surrounding a conductor core of wire, a testing electrode in operative relation with said wire and spaced from its conductor core by the insulation, a source of power, means for feeding said conductor core of wire past said electrode, a relay, a transformer having a primary winding connected to said source of power and a secondary winding connected to said testing electrode and circuit connections including said relay, for operating said relay from current flowing in said transformer when a fault in said insulation occurs.

16. In a system for testing the insulation resistance of insulation surrounding a conductor core of wire, a testing electrode in operative relation with said wire and spaced from its conductor core only by the insulation, a source of power connected to said testing electrode, a take-on roll for said wire, means for feeding said conductor core of wire past said electrode to said take-on roll, electrically responsive means sensitive to small currents connected in circuit with said testing electrode, and responsive to faulty insulation for stopping said feeding means, and a positive tell-tale connected to said testing means for indicating when power is applied thereto.

17. In a system for testing the dielectric strength and insulation resistance of insulation surrounding a conductor core of wire, a testing electrode in operative relation with said wire and spaced from its conductor only by the insulation, a source of power connected to said testing electrode, a take-on roll for said wire, means for feeding said conductor core of wire past said electrode to said take-on roll, electrically responsive means sensitive to small currents connected in circuit with said testing device, and responsive to faulty insulation for stopping said feeding means, a positive tell-tale connected to said testing means for indicating when power is applied thereto and also for indicating the insulation resistance of said wire insulation.

18. The method of testing the insulation of a wire which comprises moving a wire to be tested, applying a voltage in accordance with a predetermined desired dielectric strength between the conductor core and surface of the insulation of a wire at successive points along the moving wire, automatically limiting the current flowing from conductor core and surface of the insulation when a fault in the insulation is reached, and applying the fault resultant current flow to stop the movement of the wire and to disconnect the voltage from the wire.

19. In a system for testing the dielectric strength of insulation surrounding a conductor core of wire, a source of potential of the value to which the dielectric strength of said conductor is to be measured; a testing electrode in operable relation with said wire and spaced from its conductor core only by the insulation, said testing electrode being connected to said source of potential; means for feeding said conductor core of wire past said electrode; current limiting means in electrical circuit connection with said testing electrode; electrically responsive indicating means sensitive to small currents connected in circuit with said testing electrode, current limiting means and source of potential on the low voltage side with respect to ground and operable responsive to a dielectric fault in said wire.

RALPH L. DAVIS.